3,248,346
HEAT-RESISTANT AND OXIDATION-PROOF MATERIALS CONTAINING MOLYBDENUM DISILICIDE
Styrbjörn Amberg, Farsta, Sweden, assignor to Aktiebolaget Kanthal, Hallstahammar, Sweden
No Drawing. Filed Oct. 16, 1962, Ser. No. 230,993
Claims priority, application Sweden, Oct. 19, 1961, 10,373/61
4 Claims. (Cl. 252—518)

The present invention relates to a heat-resistant oxidation-proof material containing $MoSi_2$ and, as the case may be, an oxide component. Shaped bodies of such material have been used, inter alia, as electric resistance elements for the temperature range of 1400° to 1700° C. Such elements afford many advantageous properties but are subject to an increased brittleness upon being cooled down after having been maintained for some time in that temperature interval in which the oxide component has been subjected to recrystallization or melting. A field of particular interest for the present invention is such sintered bodies in which the oxide component contains molten bentonite. It has been found that such bodies are subjected to a considerable increase in brittleness when they are cooled down from a temperature of about 1300 to 1500° C.

It has not been possible to ascertain unequivocally the cause of this tendency to brittleness but it can be assumed that it has some connection with the fact that the silicide is particularly sensitive to any recrystallizations in the oxide component.

Surprisingly, it has been found that an addition of nitrogen in a suitable form eliminates this tendency to brittleness. To obtain this advantageous result nitrogen should be added in the form of a nitrogen compound of a type which withstands high temperatures in air, such as certain nitrides.

When using moderate temperatures, such as at most 1500° C., it is possible to obtain the desired result by adding nitrogen in the form of silicon nitride $Si_3N_4$ but this compound is not stable in an oxidizing atmosphere at higher temperatures than 1400° C. To produce materials which may be used in an oxidizing atmosphere at temperatures above 1500° C. silicon oxinitride $Si_2NO$ may be added according to the invention.

The quantity of $Si_2NO$ should be at least 0.05% by weight, preferably at least 0.2%. If the nitride $Si_3N_4$ is present in the material in any appreciable quantities, the material will not be sufficiently oxidation-proof. It is thus important that the quantity of $Si_3N_4$ be so small that its presence could be disregarded and, in any case, it should be less than 1% of the weight of the material.

Also when besides molybdenum silicide the sintered bodies contain a substantial oxide component, containing $SiO_2$, the present invention will afford a further advantage. After such bodies have been used for a long time at temperatures within the range of 1400 to 1700° C. they will suffer from a considerable reduction in their mechanical strength. This has some connection with the fact that at high temperatures the oxide component cannot prevent the grain growth of the silicide component which process makes the material more brittle. Surprisingly, it has been proved that the addition of silicon oxintride according to the present invention compensates for this inconvenience and produces bodies of molybdenum disilicide and an oxide component which bodies also after being heated for some length of time at 1700° C. maintain a high mechanical strength.

The present invention relates especially to electrical resistance elements which are composed substantially of molybdenum disilicide and an oxide component containing $SiO_2$. As a nitrogen containing addition it is particularly recommended to use silicon oxinitride but the invention is not restricted to the addition of this nitride to starting materials containing molybdenum disilicide. Also other nitrogen containing compounds which are stable in the air at high temperatures may be used as an addition.

Below the invention is further described with reference to an example.

*Example*

Silicon oxinitride $Si_2NO$ is made by heating a mixture of 200 g. silicon powder having a grain size of 75 micron and 32 g. NaOH for 48 hours at 1400° C. in an atmosphere of nitrogen and argon in proportions of 1 to 1. The product obtained is then leached-out in a mixture of hydrogen fluoride HF and nitric acid $HNO_3$ and contains thereupon only traces of Si and $Si_3N_4$. A mixture is then prepared of 1% by weight of the oxinitride obtained, 94% by weight of finely divided molybdenum disilicide having a grain size less than 8 microns, and bentonite in the form of an aqueous slurry and of a quantity of 5% by weight counted on its dry weight. The mixture is extruded to the shape of electrical resistance elements. These are initially sintered in hydrogen at 1200° C. for 30 minutes and then in air at 1550° C. for two minutes. After the final sintering the material affords a bending strength of 42 kg./mm.² After the material has been heated in air at 1430° C. for five days the strength had decreased to 34 kg./mm.² In respect of the corresponding material of $MoSi_2$ and bentonite but devoid of silicon oxinitride the strength was reduced under similar conditions from 42 kg./mm.² to 8 kg./mm.²

After a further heating at 1500 to 1700° C. the material according to this example having an addition of 1% by weight of silicon oxinitride is not subject to any further reduction of the mechanical strength and this not even after the lapse of a heating for several thousand hours.

The nitrogen addition should according to the present invention constitute at least 0.01% by weight of the material. No upper limit for the addition of nitrogen can be stated because certain nitrogen compounds, such as silicon oxinitride, constitutes by itself a material having extraordinary heat-resistant and corrosion-proof properties. The invention comprises thus also such bodies which in a substantial proportion, such as up to 70% by weight, are constituted by e.g. silicon oxinitride and which contain $MoSi_2$ and $SiO_2$ only in smaller quantities.

With reference to the special embodiment of the invention described in the above example, it is suitable to add between 0.25 and 1% by weight of $Si_2NO$ to a mixture of molybdenum silicide and $SiO_2$. However, to increase the specific electric resistance also oxides, preferably $SiO_2$ in the form of glass, may be added in such large quantities that the material, in addition to $MoSi_2$ and the nitride, includes also from 0.5 to 40% by weight of oxide.

What is to be claimed is:

1. A heat-resistant and oxidation-proof material, suitable as an electrical resistance element for temperatures above 1400° C., consisting essentially of $MoSi_2$ and containing a minor amount of $SiO_2$, such material also including at least 0.01% by weight of nitrogen in the form of a stable inorganic nitrogen compound which withstands high temperature in air and of which any $Si_3N_4$ present constitutes at the most 1% by weight of the material.

2. The composition of claim 1, in which said compound is an oxinitride of silicon.

3. The composition of claim 2, in which the amount of silicon oxinitride is from 0.25 to 1% by weight of the material.

4. The composition of claim 1 in which at least part of the $SiO_2$ is derived from bentonite.

References Cited by the Examiner
UNITED STATES PATENTS

| | | | |
|---|---|---|---|
| 2,955,145 | 10/1960 | Schrewelius | 252—518 XR |
| 2,968,530 | 1/1961 | Forgeng et al. | 106—44 |
| 3,006,865 | 10/1961 | Ruben | 252—518 |

JULIUS GREENWALD, *Primary Examiner.*